United States Patent
Yoshimi et al.

(10) Patent No.: US 6,374,209 B1
(45) Date of Patent: Apr. 16, 2002

(54) TEXT STRUCTURE ANALYZING APPARATUS, ABSTRACTING APPARATUS, AND PROGRAM RECORDING MEDIUM

(75) Inventors: Takehiko Yoshimi, Otsu; Toshiyuki Okunishi, Higashiosaka; Takahiro Yamaji, Kitakatsuragi-gun, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/271,569

(22) Filed: Mar. 18, 1999

(30) Foreign Application Priority Data

Mar. 19, 1998 (JP) .......................................... 10-070288

(51) Int. Cl.[7] .............................................. G06F 17/27
(52) U.S. Cl. .......................................... 704/9; 707/531
(58) Field of Search ................... 704/1, 9, 10; 707/530, 707/531, 101, 102; 345/349, 357

(56) References Cited

U.S. PATENT DOCUMENTS

| | | | | |
|---|---|---|---|---|
| 5,077,669 A | * | 12/1991 | Doi .............................. | 704/9 |
| 5,384,703 A | * | 1/1995 | Withgott et al. ............... | 704/9 |
| 5,638,543 A | * | 6/1997 | Pedersen et al. ............... | 704/9 |
| 5,708,825 A | * | 1/1998 | Sotomayor ..................... | 704/9 |
| 5,745,602 A | * | 4/1998 | Chen et al. .................. | 382/229 |
| 5,778,397 A | * | 7/1998 | Kupiec et al. .............. | 707/500 |
| 5,838,323 A | * | 11/1998 | Rose et al. .................. | 345/349 |
| 5,848,191 A | * | 12/1998 | Chen et al. .................. | 382/229 |
| 5,867,164 A | * | 2/1999 | Bonsstein et al. ........... | 345/357 |
| 5,924,108 A | * | 7/1999 | Fein et al. ................... | 707/531 |
| 5,963,969 A | * | 10/1999 | Tidwell ....................... | 707/531 |
| 5,978,820 A | * | 11/1999 | Mase et al. .................. | 707/531 |
| 6,185,592 B1 | * | 2/2001 | Boguraev .................... | 707/531 |

FOREIGN PATENT DOCUMENTS

JP 2-112069 4/1990

* cited by examiner

*Primary Examiner*—Patrick N. Edouard
(74) *Attorney, Agent, or Firm*—Dike, Bronstein, Roberts & Cushman, IP Group of Edwards & Angell; David G. Conlin

(57) ABSTRACT

A text input section (1) divides an inputted text into sentences and attaches a number to each of the sentences, which is stored in a text data base together with the number. An important word recognizing section (2) generates a list of important words for each sentence to store it in a storing section (8). An important word weighting section (3) weights each important word. A relation degree computing section (4) computes a relation degree between an attention sentence and a precedent sentence. An important degree computing section (5) computes an importance degree of each attention sentence. A tree structure determining section (6) determines a parent sentence of the attention sentence and determines a tree structure of the inputted text. Unlike the case of determining whether or not character strings of key words are merely coincident with each other, it is possible to determine a parent sentence of each sentence based on a degree of connection between two sentences and analyze a structure of the inputted text with high accuracy according to the above construction.

14 Claims, 11 Drawing Sheets

Fig.3

$S_1$ Amorphous Si TFT $S_2$ Active matrix LCDs which are typically used in products such as LCD color TVs are controlled by a switching element known as a thin-film transistor or thin-film diode placed at each pixel.

$S_3$ The fundamental concept was revealed in 1961 by RCA of America, a U.S. company, but basic research only began in the 1970's.

$S_4$ Amorphous Si TFT LCDs introduced in 1979 and 1980 have become the mainstream for today's active matrix displays.

$S_5$ These units place an active element at each pixel, and taking advantage of the non-linearity of the active element, are able to apply sufficient drive-voltage margin to the liquid crystal itself, even with the increase in the number of scan lines.

$S_6$ As shown in Figure 1, TFT LCDs that use amorphous Si thin-film transistors (TFTs) as the active elements are becoming the mainstream today, and full-color displays achieving contrast ratios of 100:1 and which compare favorably to CRTs are being developed.

$S_7$ The driver electronics for TFT LCDs consist of data-line drive circuitry that applies display signals to the data lines (source drivers) and scanning line drive circuitry that applies scanning signals to the gate lines (gate drivers).

$S_8$ A signal control circuit to control these operations and a power supply circuit complete the system.

$S_9$ Liquid crystal materials used in TFT LCDs are TN (twisted nematic) liquid crystals, but despite the fact that pixel counts have increased and a drive element is placed at each pixel, we have still been able to rapidly increase the contrast, viewing angle, and image quality of these displays.

$S_{10}$ However, manufacturing technologies to fabricate several hundred thousand such elements onto the surface of a large screen are extremely problematic, and the fundamental approach developed in 1987 is still being used today.

Fig.4

| Sentence | Number of important word |
|---|---|
| S1 | 3 |
| S2 | 19 |
| S3 | 13 |
| S4 | 12 |
| S5 | 21 |
| S6 | 25 |
| S7 | 25 |
| S8 | 9 |
| S9 | 27 |
| S10 | 17 |

Fig.5

| | | Precedent sentence $S_i$ | | | | | | | | |
|---|---|---|---|---|---|---|---|---|---|---|
| | | S1 | S2 | S3 | S4 | S5 | S6 | S7 | S8 | S9 |
| Attention sentence $S_j$ | S2 | 0/3 | — | — | — | — | — | — | — | — |
| | S3 | 0/3 | 0/19 | — | — | — | — | — | — | — |
| | S4 | 3/3 | 3/19 | 0/13 | — | — | — | — | — | — |
| | S5 | 0/3 | 6/19 | 0/13 | 2/12 | — | — | — | — | — |
| | S6 | 3/3 | 5/19 | 0/13 | 9/12 | 2/21 | — | — | — | — |
| | S7 | 1/3 | 1/19 | 0/13 | 3/12 | 5/21 | 3/25 | — | — | — |
| | S8 | 0/3 | 2/19 | 0/13 | 0/12 | 0/21 | 0/25 | 1/25 | — | — |
| | S9 | 1/3 | 5/19 | 0/13 | 3/12 | 9/21 | 6/25 | 4/25 | 0/9 | — |
| | S10 | 0/3 | 1/19 | 1/13 | 1/12 | 1/21 | 4/25 | 0/25 | 0/25 | 3/27 |

| Sentence | Relation degree d | Character string-coincident word | Importance degree I | Parent sentence |
|---|---|---|---|---|
| S1 | — | — | 1 | ROOT |
| S2 | 0 | φ | 0 | NULL |
| S3 | 0 | φ | 0 | NULL |
| S4 | 1 | amorphous, Si, TFT | 1 | S1 |
| S5 | 2/12 | active, active | 1/6 | S4 |
| S6 | 1 | amorphous, Si, TFT | 1 | S1 |
| S7 | 1/3 | TFT | 1/3 | S1 |
| S8 | 1/25 | signal | 1/75 | S7 |
| S9 | 1/3 | TFT | 1/3 | S1 |
| S10 | 4/25 | element, develop, use, today | 4/25 | S6 |

Fig.10

| Sentence | Importance degree I | Selection order |
|---|---|---|
| S0 | 1 | — |
| S1 | 1 | 1 |
| S2 | 0 | — |
| S3 | 0 | — |
| S4 | 1 | 2 |
| S5 | 1/6 | 6 |
| S6 | 1 | 3 |
| S7 | 1/3 | 4 |
| S8 | 1/75 | 8 |
| S9 | 1/3 | 5 |
| S10 | 4/25 | 7 |

Fig.11

$S_1$ Amorphous Si TFT $S_4$ Amorphous Si TFT LCDs introduced in 1979 and 1980 have become the mainstream for today's active matrix displays.

$S_6$ As shown in Figure 1, TFT LCDs that use amorphous Si thin-film transistors (TFTs) as the active elements are becoming the mainstream today, and full-color displays achieving contrast ratios of 100:1 and which compare favorably to CRTs are being developed.

Fig. 14

$S_1$ Non-Polarizer-Type LCD Technology Trends $S_2$ (1) Cholesteric/nematic phase shift types $S_3$ This approach uses a guest-host liquid crystal in which a dichroic dye is added to a cholesteric/nematic phase-shift liquid crystal, and makes use of optical absorption and optical transmissivity based on shifting the alignment of the dye.

$S_4$ Because no polarizer is needed, this approach achieves a bright display, and because low-voltage control and reliability is also increased, a bright reflective-type color LCD display combined with active-element addressing becomes possible.

$S_5$ Sharp has announced development two types of reflective-type color LCDs based on the phase-change guest-host (PCGH) approach–one type which uses 3-contact active elements, and another which uses 2-contact active elements known as the double-metal guest-host (DMGH) system.

$S_6$ We will describe DMGH reflective-type color LCDs.

$S_7$ This approach uses a guest-host (GH) liquid crystal.

$S_8$ We will explain this method based on the block diagram shown in Figure 1.

$S_9$ In "phase-shift" types, a dye (the "guest") is mixed into a liquid crystal (the "host") which has properties such that, in its natural state, its molecules arrange themselves in a helical shape.

$S_{10}$ With no voltage applied, the liquid crystal remains in its helical shape and external light is absorbed by the guest, and the display appears black.

$S_{11}$ Conversely, when a voltage is applied, the helical alignment breaks down and external light reaches the aluminum reflective electrodes and becomes reflected light, thereby causing color to appear.

$S_{12}$ In this way, the PCGH method, which does not require a polarizer, can be effectively applied to make use of natural light, and by forming highly reflective pixel electrodes via a passivation layer deposited on top of double-metal elements and through complementary-color micro-filters, it becomes possible to derive a four-color display from just two colors.

$S_{13}$ (2) Polymer Dispersed Liquid Crystal (PDLC) Displays $S_{14}$ This approach takes advantage of the optical dispersion that results from the difference in refractive indexes of liquid crystals and polymers.

$S_{15}$ The refractive index of a liquid crystal can be varied by applying a voltage, and when the refractive index of the liquid crystal and polymer are equal, the material becomes transparent.

$S_{16}$ As shown in Figure 2, liquid crystal droplets are dispersed in a polymer.

$S_{17}$ A light-absorbing layer is also applied to the back surface.

$S_{18}$ When light is dispersed by the material, the display appears white as a result of back scattering; when transparent, light that penetrates to the back surface is absorbed by the absorption layer, and the display appears black.

$S_{19}$ This technique has been suggested for use with 1) dispersion-type LCDs that exploit differences in the refractive indexes of liquid crystals and polymers and 2) guest/host LCDs by adding a dichroic dye to a nematic liquid crystal material.

$S_{20}$ Because these types eliminate the need for polarizers, the potential to achieve a bright, clear display is extremely high.

$S_{21}$ But problems remain, for example, high drive voltages are generally required.

$S_{22}$ Sharp continues to work on improving the liquid crystal material and panel fabrication aspects of this technology.

Fig.15A

| Sentence | Importance degree lps | Parent sentence | Character string - coincident word |
|---|---|---|---|
| S0 | 1 | ROOT | — |
| S1 | 1 | S0 | Non-Polarizer-Type, LCD, technology, trend |
| S2 | 0 | NULL | ϕ |
| S3 | 0 | NULL | ϕ |
| S4 | 1/4 | S1 | LCD |
| S5 | 1/4 | S1 | LCD |
| S6 | 1/4 | S1 | LCD |
| S7 | 1/48 | S5 | use, host |
| S8 | 0 | NULL | ϕ |
| S9 | 1/48 | S5 | type, host |
| S10 | 1/84 | S4 | display |
| S11 | 1/20 | S6 | color |
| S12 | 3/20 | S6 | color, color, color |

Fig.15B

| Sentence | Importance degree lps | Parent sentence | Character string - coincident word |
|---|---|---|---|
| S0 | 1 | ROOT | — |
| S13 | 1 | S0 | polymer, disperse, liquid_crystal, PDLC, display |
| S14 | 2/6 | S13 | liquid_crystal, polymer |
| S15 | 3/6 | S13 | liquid_crystal, liquid_crystal, polymer |
| S16 | 3/6 | S13 | liquid_crystal, disperse, polymer |
| S17 | 0 | NULL | ϕ |
| S18 | 3/6 | S13 | disperse, display, display |
| S19 | 1/4 | S16 | liquid_crystal, polymer, liquid_crystal |
| S20 | 1/6 | S13 | display |
| S21 | 3/84 | S15 | voltage |
| S22 | 1/6 | S13 | liquid_crystal |

Fig.16

| Sentence | Entire importance degree I | Selection order |
|---|---|---|
| S1 | 1 | 1 |
| S2 | 0 | — |
| S3 | 0 | — |
| S4 | 1/4 | 3 |
| S5 | 1/4 | 4 |
| S6 | 1/4 | 5 |
| S7 | 1/48 | 15 |
| S8 | 0 | — |
| S9 | 1/48 | 16 |
| S10 | 1/84 | 18 |
| S11 | 1/20 | 14 |
| S12 | 3/20 | 10 |
| S13 | 1/2 | 2 |
| S14 | 2/12 | 9 |
| S15 | 3/12 | 6 |
| S16 | 3/12 | 7 |
| S17 | 0 | — |
| S18 | 3/12 | 8 |
| S19 | 1/8 | 11 |
| S20 | 1/12 | 12 |
| S21 | 3/168 | 17 |
| S22 | 1/12 | 13 |

TEXT STRUCTURE ANALYZING APPARATUS, ABSTRACTING APPARATUS, AND PROGRAM RECORDING MEDIUM

BACKGROUND OF THE INVENTION

The present invention relates to a text structure analyzing apparatus analyzing structure of a text described in natural language and an abstracting apparatus generating an abstract by selecting important elements from the text.

In recent years, with a rapid and wide use of electronic text, the necessity of technique of processing a text, namely, analyzing the structure of the text and selecting important sentences therefrom is increasingly required. In order to generate an abstract by selecting important sentences from the text, it is indispensable to analyze the structure of the text and evaluate the importance degree of each sentence constituting the text.

There is conventionally provided an automatic abstracting method disclosed in Japanese Laid-Open Patent Publication No. 2-112069 to evaluate an importance degree of each sentence by analyzing the structure of text and generate an abstract from an evaluated result thereof. The automatic abstracting method is as follows.

Of precedent sentences S including a key word whose character string is coincident with a character string of a key word included in sentences $S_j$ constituting a text, a sentence closest to the sentence $S_j$ is set as a parent sentence thereof. This operation allows the structure of the text to be expressed in a tree structure.

In the tree structure obtained by the operation, sentences included in a path between a head sentence (base node of tree structure) of the text and a last sentence of the text are regarded as important sentences. The chain of the important sentences are set as an abstract sentence.

However, the automatic abstracting method has the following problem:

(1) Merely the coincidence between the character strings of both key words is not enough to fully catch the connection between two sentences. In particular, when a text is constituted of a plurality of sub-topics, this tendency is conspicuous. That is, for example, when topics are switched from one to another, key words different from key words which have been on sentences appear many times.

(2) In determining the parent sentence of a sentence S, comparison between candidate sentences of the parent sentence is not made sufficiently in determining which of the sentences is best as the parent sentence. Thus, the conventional method is incapable of analyzing the structure of the text with high accuracy.

(3) The path between the head sentence of the text and the last sentence thereof may be comparatively long. Accordingly, when the sentence included in the path is selected, it is impossible to generate an abstract sufficiently concise.

SUMMARY OF THE INVENTION

It is an object of the present invention to provide a text structure analyzing apparatus analyzing structure of a text with high accuracy and an abstracting apparatus capable of obtaining an abstract highly accurate and concise.

In order to achieve the object, the present invention provides a text structure analyzing apparatus analyzing a connection between respective elements constituting a text and based on an analyzed result, indicating a structure of the text by means of a tree structure which represents the respective elements as nodes, comprising:

an element appearance position storing section dividing an inputted text into the elements and storing an appearance position relationship among the elements on the inputted text;

a relation degree computing section determining a precedent element of an attention element with reference to the appearance position relationship and computing a relation degree representing strength of a connection between the attention element and each precedent element;

an importance degree computing section computing an importance degree of the attention element, based on a relation degree between the attention element and each precedent element and an importance degree of a head element of the inputted text;

a structure determining section determining a tree structure of the inputted text by determining the precedent element having an optimum value as an importance degree of the attention element as a parent element of the attention element; and an output section outputting the determined tree structure of the inputted text.

According to the construction, the parent element of each element in the tree structure of the inputted text is determined in consideration of the relation degree representing the strength of connection between the attention element and each precedent element and the importance degree of each element based on the relation degree. Thus, candidates of the parent element are compared with each other in much consideration of the connection between the two elements. Accordingly, it is possible to analyze the structure of the inputted text with high accuracy by setting only the element having a high degree of relation with the attention element as the parent element.

In an embodiment, the element is a sentence.

According to the construction, comparison between candidates of the parent sentence can be made in much consideration of the connection between two sentences. Thus, it is possible to analyze the structure of an inputted text with high accuracy by setting only a sentence having a high degree of relation with the attention element as the parent element.

An embodiment further comprises an important word recognizing section recognizing important words from words constituting the respective elements;

and important word weighting section weighting each of the recognized important words, wherein the relation degree computing section has an important word comparing part for comparing a character string of an original form of each of the important words in the attention element with a character string of an original form of each of the important words in the precedent element to compute a relation degree between the attention element and the precedent element, based on a total value of weights of all the important words common to the attention element and to the precedent element and a number of all the important words in the attention element or a number of all the important words in the precedent element.

According to the construction, when important words common to the attention element and the precedent element are present, a relation degree corresponding to the total value of the weights of all the important words common to the attention element and the precedent element is given. In this manner, an optimum relation degree can be obtained according to the degree of connection between the attention element and the precedent element.

An embodiment further comprises an important word information storing section in which parts of speech to be recognized as the important words are stored, wherein the important word recognizing section has a part of speech recognizing section for recognizing parts of speech in the respective elements; and a part of speech comparing section for comparing the recognized parts of speech and parts of speech to be recognized as the important words with each other to recognize words corresponding to parts of speech to be recognized as the important words from among words in the respective elements.

According to the construction, the important words are recognized based on a part of speech set in advance and stored. Thus, the important words can be easily recognized by consulting a dictionary.

An embodiment further comprises an important word recognizing section recognizing important words from words constituting the elements;

a meaning recognizing section recognizing meaning of each of the recognized important words; and a concept system storing section storing a concept system for recognizing rank relationship between meanings of two of the recognized important words, an analogous relationship therebetween, and a part-to-whole relationship therebetween;

wherein the relation degree computing section has a determining section which regards that with reference to the concept system, one of the recognized important words in the attention element and one of the recognized important words in the precedent element have a semantic connection when the two important words have the rank relationship among meanings thereof, the analogous relationship therebetween, and the part-to-whole relationship therebetween to compute a relation degree between the attention element and the precedent element, based on a total value of weights of all the important words, having the semantic connection, in the attention element and the precedent element and the number of all the important words in the attention element or the number of all the important words in the precedent element.

According to the construction, an important word in the attention element and an important word in the precedent element are regarded to have a semantic connection when the meaning of the two important words have a rank relationship, an analogous relationship, and a part-to-whole relationship and the like. A relation degree is determined according to the total value of weights of all the important words, having the semantic connection, in the attention element and the precedent element. In this manner, an optimum relation degree can be obtained according to the degree of connection between the attention element and the precedent element.

The present invention provides an abstracting apparatus analyzing a connection between respective elements constituting a text and generating an abstract of the text by imparting an importance degree to the respective elements, based on an analyzed result and selecting the respective elements in the order from a higher importance degree to a lower importance degree comprising:

an element appearance position storing section dividing an inputted text into the elements and storing an appearance position relationship among the elements on the inputted text;

a specific word list generating section generating a list of specific words by recognizing the specific words from among words constituting a specific element and attaching the generated specific word list to a front of a head element of the inputted text;

a relation degree computing section determining a precedent element of an attention element with reference to the appearance position relationship in which the specific word list is set as a head element and computing a relation degree representing strength of a connection between the attention element and each precedent element;

an importance degree computing section computing an importance degree of the attention element, based on a relation degree between the attention element and each precedent element and an importance degree of the specific word list, an element selection section selecting a predetermined number of elements in a descending order from an element having a highest importance degree obtained by computation; and an output section outputting the selected predetermined number of elements as an abstract of the inputted text.

According to the construction, the abstract of the inputted text can be obtained by computing the importance degree of the attention element based on the relation degree representing the degree of connection between the attention element and each precedent element and selecting predetermined number of elements in descending order from an element having a highest importance degree. Thus, candidates of the parent element are compared with each other in much consideration of the connection between the two elements, and thus it is possible to select only an important element having a high degree of relation with the specific word list as the abstract. Therefore, according to the present invention, it is possible to generate the abstract which has high accuracy and is concise.

In an embodiment, the element is a sentence.

According to the construction, because comparison between candidates of the parent sentence can be made in much consideration of the connection between two sentences. Thus, it is possible to select only a sentence having a high degree of relation with the specific word list as the abstract.

An embodiment further comprises a specific word information storing section in which parts of speech to be recognized as the specific words are stored, wherein the specific word list generating section has a part of speech recognizing section for recognizing parts of speech of words constituting an element representing a title; and a part of speech comparing section for comparing the recognized part of speech and the parts of speech to be recognized as the specific words with each other to recognize as the specific word a word corresponding to the parts of speech to be recognized as the specific word from among the words constituting the element representing the title.

According to the construction, specific words are recognized based on a part of speech set and stored in advance. Thus, the specific word can be recognized easily by consulting a dictionary.

The present invention provides an abstracting apparatus analyzing a connection between respective elements constituting a text and generating an abstract of the text by imparting an importance degree to the respective elements, based on an analyzed result and selecting the respective elements in the order from a higher importance degree to a lower importance degree, comprising:

an element appearance position storing section dividing an inputted text into the elements and storing an appearance position relationship among the elements on the inputted text;

a fragment dividing section dividing the inputted text into larger fragments than the elements;

a specific word list generating section generating a list of specific words in each of the fragments by recognizing the specific words from among words constituting a specific element and attaching the generated specific word list to a front of a head element of the inputted text;

a relation degree computing section determining a precedent element of an attention element in each of the fragments with reference to the appearance position relationship in which the specific word list is set as a head element and computing a relation degree representing strength of a connection between the attention element and each precedent element;

an in-fragment importance degree computing section computing an importance degree of the attention element in each of the fragments, based on a relation degree between the attention element and each precedent element and an importance degree of the specific word list, a fragment importance degree setting section setting an importance degree of each fragment;

an entire importance degree computing section computing an importance degree of the attention element in the entire inputted text, based on an importance degree of the attention element in each fragment and an importance degree of the fragment to which the attention element belongs;

an element selection section selecting a predetermined number of elements in a descending order from an element having a highest importance degree, in the entire inputted text, obtained by computation; and an output section outputting the selected predetermined number of elements as an abstract of the inputted text.

According to the construction, the importance degree of the attention element is computed in each of the fragments, based on the relation degree between the attention element and each precedent element. The importance degree of each fragment to which the attention element belongs is set. The importance degree (entire importance degree) of the attention element in the entire inputted text is computed, based on the importance degree of the attention element in each fragment and the importance degree of the fragment to which the attention element belongs. A predetermined number of elements is selected in descending order from an element having a highest entire importance degree, thus the abstract being generated. In this manner, after the importance degree of each element in the fragment is determined, the entire importance degree is computed in consideration of the importance degree in each fragment. Thus, for each fragment, it is possible to select only an element having a high degree of relation with the specific word list as the candidate of the abstract. Accordingly, even if the contents of the descriptions are varied every fragment, it is possible to generate the abstract of each fragment without omission, according to the importance degree of each fragment.

In an embodiment, the element is a sentence, and the fragment is a paragraph.

According to the construction, it is possible to select only an element having a high degree of relation with the specific word list as the abstract for each paragraph composing an inputted text. Accordingly, even if the contents of the descriptions of fragments are varied, it is possible to generate the abstract of each fragment without omission, according to the importance degree of each fragment.

An embodiment further comprises a fragment importance degree storing section classifying and storing importance degrees to be imparted to the fragments according to an appearance position of each of the fragments in the inputted text, wherein the fragment importance degree setting section determines an appearance position of an attention fragment on the inputted text with reference to an appearance position relationship among the elements in which the specific word list is set as a head element and sets an importance degree of the attention fragment with reference to an appearance position of each of the fragments stored in the fragment importance degree storing section.

According to the construction, importance degrees of the respective fragments classified according to the appearance position thereof on the inputted text are stored in advance. Thus, for example, a high degree of importance is imparted to a head fragment which is supposed to contain many important elements. In this case, it is possible to generate an abstract by automatically selecting important elements preferentially from a fragment having a higher degree of relation with the head fragment.

The present invention provides a program recording medium in which a text structure-analyzing program is recorded to function:

an element appearance position storing section dividing an inputted text into elements and storing an appearance position relationship among the elements on the inputted text;

a relation degree computing section computing a relation degree representing strength of connection between an attention element and each of precedent elements;

an importance degree computing section computing an importance degree of the attention element, based on a relation degree between the attention element and each precedent element and an importance degree of a head element of the inputted text;

a structure determining section determining a structure of the inputted text by setting the precedent element having an optimum value as the importance degree of the attention element as a parent element of the attention element; and an output section outputting the determined tree structure of the inputted text.

According to the construction, similarly to the next structure analyzing apparatus of the embodiment, candidates of the parent element are compared with each other in much consideration of the connection between the two elements. Accordingly, it is possible to analyze the structure of an inputted text with high degree of relation with the attention element as the parent element.

The present invention provides a program recording medium in which a text structure-analyzing program is recorded to function:

an element appearance position storing section dividing an inputted text into elements and storing an appearance position relationship among the elements on the inputted text;

a specific word list generating section generating a list of specific words by recognizing the specific words from among words constituting a specific element and attaching the generated specific word list to a front of a head element of the inputted text;

a relation degree computing section computing a relation degree representing the strength of connection between an attention element and each precedent element;

an importance degree computing section computing an importance degree of the attention element, based on a relation degree between the attention element and each precedent element and an importance degree of the list of specific words;

an element selection section selecting a predetermined number of elements in a descending order from an element having a highest importance degree obtained by the computation; and an output section outputting the selected predetermined number of elements as an abstract of the inputted text.

According to the construction, similarly to the abstracting apparatus of the embodiment, it is possible to select only an important element having a high degree of relation with the specific word list as the abstract. Therefore, it is possible to generate the abstract which has high accuracy and is concise.

The present invention provides a program recording medium in which a text structure-analyzing program is recorded to function:

an element appearance position storing section dividing an inputted text into elements and storing an appearance position relationship among the elements on the inputted text;

a fragment dividing section dividing the inputted text into larger fragments than the elements;

a specific word list generating section generating a list of specific words by recognizing the specific words from among words constituting a specific element in each fragment and attaching the generated list of specific words to a front of a head element of each fragment;

a relation degree computing section computing a relation degree representing strength of connection between the attention element and each precedent element in each fragment;

an in-fragment importance degree computing section computing an importance degree of the attention element, based on a relation degree between the attention element and each precedent element in each of the fragments and an importance degree of the list of specific words;

a fragment importance degree setting section setting an importance degree of each of the fragments;

an entire importance degree computing section computing an importance degree of the attention element in the entire inputted text, based on an importance degree of the attention element in each fragment and an importance degree of the fragment to which the attention element belongs;

an element selection section selecting a predetermined number of elements in a descending order from an element having a highest importance degree, in the entire inputted text, obtained by computation; and an output section outputting the selected predetermined number of elements as an abstract of the inputted text.

Thus, similarly to the abstracting apparatus of an embodiment, for each fragment greater than the respective elements, it is possible to select only an element having a high degree of relation with the specific word list as the candidate of the abstract. Accordingly, even if the contents of the descriptions of fragments are varied every fragment, it is possible to generate the abstract of each fragment, according to the importance degree of each fragment.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a concept view of an inputted text stored in a storing section of the text structure analyzing apparatus shown in FIG. 1;

FIG. 4 shows the number of important words obtained from the inputted text shown in FIG. 3;

FIG. 5 shows the relation degree between attention sentences and precedent sentences in the inputted text shown in FIG. 3;

FIG. 10 shows a specific word list of an inputted text shown in FIG. 3 and the importance degree of each sentence;

FIG. 11 shows an abstract of the inputted text shown in FIG. 3;

FIG. 14 shows a concept of an inputted text stored in the storing section of the abstracting apparatus shown in FIG. 12;

FIG. 15 shows the importance degree of each sentence in each paragraph of the inputted text shown in FIG. 14; and FIG. 16 shows an entire importance degree of each sentence of the inputted text shown in FIG. 14 and a selection order.

DETAILED DESCRIPTION OF THE PREFERRED EMBODIMENTS

The present invention will be described below by referring to embodiments thereof as shown in the accompanying drawings.

First Embodiment

Figure 1:
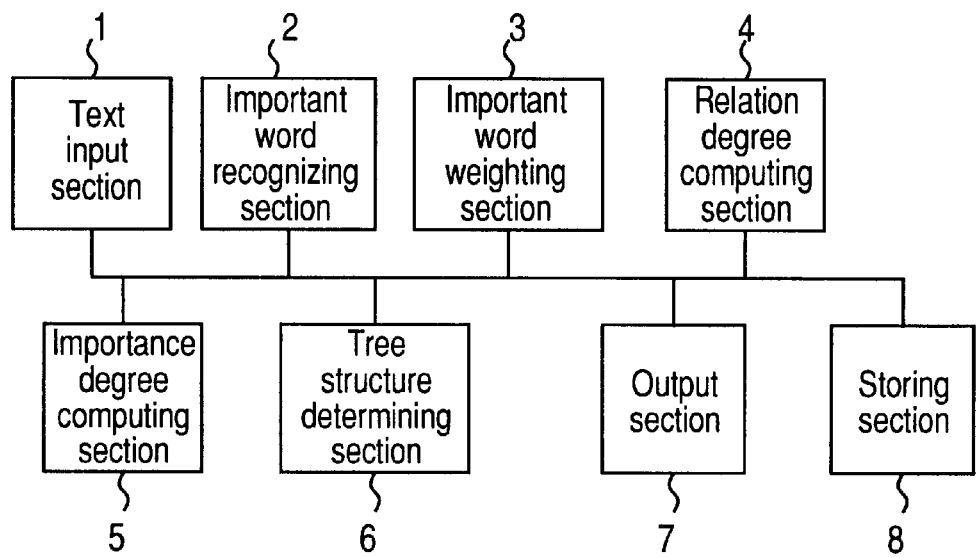
FIG. 1 is a block diagram of a text structure analyzing apparatus of the present invention.

The first embodiment relates to a text structure analyzing apparatus capable of analyzing the structure of a text with high accuracy. FIG. 1 is a block diagram showing the text structure analyzing apparatus of the first embodiment.

A text input section 1 reads a text to be analyzed and divides it into elements E such as a sentence or the like. The data of the elements E thus generated is stored in a data base of a storing section 8 such that the position relationship among the elements E are understood. An important word recognizing section 2 recognizes important words for each of the elements E with reference to a dictionary of the storing section 8 and generates an important word list for each of the elements E. The storing section 8 stores the important word list.

An important word weighting section 3 weights the important words extracted from each of the elements E. Based on the important word list and the weight, a relation degree computing section 4 computes the relation degree between an attention element $E_j$ and a precedent element $E_i$ as will be described later in detail. Based on the relation degree and the like, an importance degree computing section 5 computes the importance degree of the attention element $E_j$ as will be described later in detail. Based on the relation degree, the importance degree and the like, a tree structure determining section 6 obtains the parent element of the attention element $E_j$ in the structure of an inputted text, as will be described later in detail. Then, based on the obtained parental relation of each of the elements E, the tree structure determining section 6 determines the tree structure of the inputted text in which the respective elements E are set as nodes. An output section 7 outputs the tree structure of the inputted text.

Figure 2:
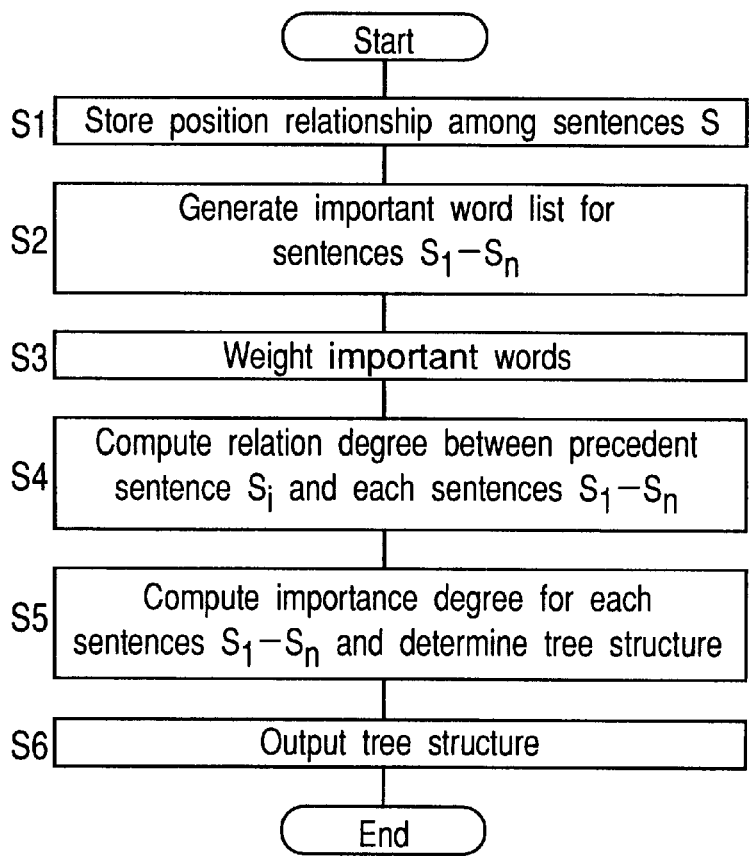
FIG. 2 is a flowchart showing text structure analyzing processing which is executed by the text structure analyzing apparatus shown in FIG. 1.

FIG. 2 is a flowchart showing text structure analyzing processing which is executed by the text structure analyzing apparatus having the construction. With reference to FIG. 2, the operation of the text structure analyzing apparatus will be described below. Although the element E is a sentence S herein, the element E may be a paragraph or the like.

At step S1, the text input section 1 reads a text to be analyzed and divides the text into sentences S each of which is a portion of the text sandwiched between two periods. Then, the text input section 1 attaches a number to each sentence S in an input order. Data thus generated is stored in the data base of the storing section 8 in the input order, as exemplified in FIG. 3. In this manner, the position relationship among the respective sentences S can be understood.

At step S2, the important word recognizing section 2 reads the sentences S from the text data base and recognizes important words of each of the sentences S, with reference to the dictionary of the storing section 8. The important word recognizing section 2 recognizes the important words, based on "a part of speech". That is, noun, verb, adjective, and adverb are regarded as important words. Accordingly, in the case of a sentence $S_2$ shown in FIG. 3, the following words are extracted as important words: "active", "matrix", "LCD", "typically", "use", "product", "LCD", "color", "TV", "control", "switching", "element", "know", "thin-film", "transistor", "thin-film", "diode", "place", and "pixel". The important word recognizing section 2 generates an important word list for each of the sentences S. The storing section 8 stores the important word list. FIG. 4 shows the number of important words for each of the sentences S obtained from the text shown in FIG. 3.

At step S3, the important word weighting section 3 weights the important words extracted from the respective sentences S. In this case, a weight value "1" is attached to all the important words.

At step S4, based on the important word list and the weighted value, the relation degree computing section 4 computes the relation degree indicating the degree of connection between an attention sentence $S_j$ and a precedent sentence $S_i$. The relation degree is computed based on:

1) The distance between the attention sentence $S_j$ and the precedent sentence $S_i$ (how many sentences are present between the attention sentence $S_j$ and the precedent sentence $S_i$)
2) The weight of each important word included in the attention sentence $S_j$ or the weight of each important word included in the precedent sentence $S_i$
3) Semantic connection between the important words included in the attention sentence $S_j$ and the important words included in the precedent sentence $S_i$
4) Correspondence between the important words included in the attention sentence $S_j$ and the important words included in the precedent sentence $S_i$.

In the description made below, the relation degree $d_{i-j}$ between the attention sentence $S_j$ and the precedent sentence $S_i$ is determined by using an equation (1) shown below.

$$d_{i-j} = \text{(total of weights of original forms (headword) of important words included in both } S_j \text{ and } S_i\text{)/(number of original forms of important words included in } S_i) \quad (1)$$

The numerator at the right side of equation (1) indicates the total of the weights of the important words which are concurrently included in the attention sentence $S_j$ and the precedent sentence $S_i$, the important words in the attention sentence $S_j$, and the present sentence $S_i$ being coincident with each other in character strings of the original forms of the important words (because the weight value "1" is attached to all the important words, "total of the weights of the important words" is synonymous with "the number of the important words").

When the semantic connection between two important words is caught by utilizing a concept system for recognizing the ranks of the meanings of the important words, analogous relationships therebetween, and part-to-whole relationships, equation (1) should be changed to equation (2).

$$d_{i-j} = \text{(total of weights of important words included in } S_j \text{ and } S_i \text{ and analogous with each other)/(number of original forms of important words included in } S_i) \quad (2)$$

According to equation (1), the original forms of the important words included in the attention sentence $S_4$ and the precedent sentence $S_2$ are three words, "active", "matrix", and "LCD". The number of the important words included in the precedent sentence $S_2$ is 19, as described previously. Thus, the relation degree $d_{2-4}$ between the attention sentence $S_4$ and the precedent sentence $S_2$: $d_{2-4} = 3/19$. FIG. 5 shows the relation degree $d_{i-j}$ between each precedent sentence $S_i$ and the attention sentences $S_j$ shown in FIG. 3.

At step S5, the importance degree computing section 5 computes the importance degree $I_j$ of each of the attention sentence $S_j$, based on the value of the relation degree $d_{i-j}$ computed at step S4. The importance degree $I_j$ is computed by using an equation (3) shown below, based on (1) the importance degree $I_i$ of the precedent sentence $S_i$ and (2) the relation degree $d_{i-j}$ between the attention sentence $S_j$ and precedent sentence $S_i$.

$$I_j = \max(I_i \times d_{i-j}) \quad (3)$$

i<j

Accordingly, in the case of the text shown in FIG. 3, the importance degree $I_j$ of each attention sentence $S_j$ is computed as follows. The importance degree $I_1$ of the head sentence $S_1$ is set to "1".

Importance degree $I_2$ of sentence $S_2$=$I_1 \times d_{1-2}$=1×0/3=0

Importance degree $I_3$ of sentence $S_3$=max{$I_1 \times d_{1-3}$, $I_2 \times d_{2-3}$}=max{1×0/3, 0×0/19}=0

Importance degree $I_4$ of sentence $S_4$=max{$I_1 \times d_{1-4}$, $I_2 \times d_{2-4}$, $I_3 \times d_{3-4}$}=max{1×3/3, 0×3/19, 0×0/13}=1

Importance degree $I_5$ of sentence $S_5$=max{$I_1 \times d_{1-5}$, $I_2 \times d_{2-5}$, $I_3 \times d_{3-5}$, $I_4 \times d_{4-5}$}=max{1×0/3, 0×6/19, 0×0/13, 1×2/12}=1/6

Figures 6, 7:
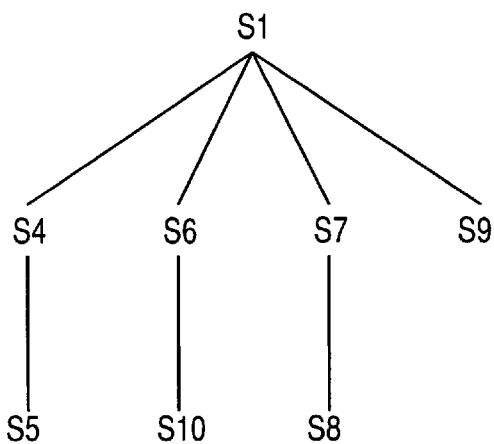
FIG. 6 shows the importance degree of each sentence and parent sentences in the inputted text shown in FIG. 3;.
FIG. 7 shows the tree structure of the inputted text shown in FIG. 3.

The importance degrees $I_6$–$I_{10}$ of each of the attention sentences $S_6$–$S_{10}$ are computed in similar manners. FIG. 6 shows the importance degree I of each sentence S of the text shown in FIG. 3.

The tree structure determining section 6 determines the tree structure of the inputted text 3 (shown in FIG. 3) stored in the text data base. In this embodiment, the precedent sentence $S_i$ which makes the value of {(importance degree $I_i$ of precedent sentence $S_i$)×(relation degree $d_{i-j}$ between attention sentence $S_j$ and precedent sentence $S_i$)} maximum is set as the parent sentence of the attention sentence $S_j$. It is to be noted that if there is a plurality of precedent sentences $S_i$ making the value of {(importance degree $I_i$ of precedent sentence $S_i$)×(relation degree $d_{i-j}$ between attention sentence Sand precedent sentence $S_i$)} maximum, the precedent sentence $S_j$ closest to the attention sentence $S_j$ is set as the parent sentence thereof. FIG. 6 shows the importance degree of attention sentences $S_j$ and the parent sentences thereof.

In FIG. 6, the "relation degree d" means the relation degree between the attention sentence S and its parent sentence, and the "character string-coincident word" is the original form of each important word included in both the attention sentence $S_j$ and its parent sentence. In FIG. 6, the symbol "φ" means that no character string-coincident word is present in the attention sentence $S_j$ and is the parent sentence. The symbol "ROOT" shown in the column of "parent sentence" means a base node, and the symbol "NULL" means that no parent sentence is present for the attention sentence S,The tree structure of the text is decided by finding the parent sentence of each attention sentence $S_j$ and the base nodes.

At step S6, the output section 7 outputs the tree structure which has each attention sentence $S_j$ formed as nodes and which is determined at step S5 as the result of the analysis of the text structure. FIG. 7 shows the tree structure of the text shown in FIG. 3. When the output section 7 outputs the tree structure, the text structure analyzing processing terminates.

As described above, in the embodiment, the text input section 1 divides the inputted text into sentences S and attaches a number to each of the sentences S in such a manner that the position relationship among the sentences S can be understood. The data thus generated is stored in the text data base of the storing section 8. Then, the important word recognizing section 2 extracts the important words from each sentence S and generates the important word list to store the important word list in the storing section 8. Then, using the important word list and the weight of each of the important words, the relation degree computing section 4 computes the relation degree between the attention sentence $S_j$ and the precedent sentence $S_i$, based on (1) the distance between the attention sentence $S_j$ and the precedent sentence $S_i$ (how many sentences are present between the attention sentence $S_j$ and the precedent sentence $S_i$); (2) the weight of important words included in the attention sentence $S_j$ or the weight of important words included in the precedent sentence $S_i$, (3) the semantic connection between the important words included in the attention sentence $S_j$ and the important words included in the precedent sentence $S_i$, and (4) the correspondence between the important words included in the attention sentence $S_j$ and the important words included in the precedent sentence $S_i$. Further, for all precedent sentences $S_i$, the importance degree computing section 5 computes the product of (relation degree $d_{i-j}$ between attention sentence $S_j$ and precedent sentence $S_i$) and (importance degree $I_i$ of precedent sentence $S_i$) and sets the maximum value of all the products as the importance degree $I_j$ of the attention sentence $S_j$. Further, the importance degree computing section 5 sets the precedent sentence $S_i$ having the maximum value as the parent sentence of the attention sentence $S_j$. The tree structure of the text is decided, with the sentence $S_1$ set as the base node.

Thus, unlike the case in which the character is strings of key words are merely coincident with each other, in the embodiment, it is possible to decide the parent sentence of each sentence S in consideration of the relation degree $d_{i-j}$ between the attention sentence $S_j$ and the precedent sentence $S_i$ based on:
(1) The distance between the attention sentence $S_j$ and the precedent sentence $S_i$;
(2) The weight of each important word included in the attention sentence $S_j$ or the weight of each important word included in the precedent sentence $S_i$;
(3) The semantic connection between the important words included in the attention sentence $S_j$ and the important words included in the precedent sentence $S_i$;
(4) The correspondence between the important words included in the attention sentence $S_j$ and the important words included in the precedent sentence $S_i$; and in addition, the importance degree $I_i$ of the precedent sentence $S_i$; and the like.

That is, according to the embodiment, it is possible to compare candidates of the parent sentence by much considering the connection between two sentences S. Accordingly, it is possible to allow only an important sentence (node) having the closest relation with the attention sentence (attention node) to be the parent sentence (parent node). Thus, it is possible to analyze the text with high accuracy.

A modification of the embodiment will be described below.

As to Important Word Recognizing Section 2

In the embodiment, although the important word recognizing section 2 is so constructed that it recognizes noun, verb, adjective, and adverb as the important words, the important word recognizing section 2 may be constructed as follows:

(1) The range of appearance frequency in which a word to be regarded as an important word appears is set in advance and stored in the storing section 8. The important word recognizing section 2 counts the appearance frequency of words constituting the inputted text. If a counted value falls in the range, the important word recognizing section 2 recognizes the word as the important word. The recognized important word is stored in the storing section 8, together with the appearance frequency.

(2) An appearance position of a word to be regarded as an important word is set in advance and stored in the storing section 8. From among the words composing the inputted text, the important word recognizing section 2 extracts a word present at the appearance position and a word having the same character string as that of the word present at the appearance position. The important word recognizing section 2 recognizes the extracted word as the important word. The recognized important word is stored in the storing section 8, together with the appearance position.

(3) The kind of character ornament (for example, underline) of a word to be regarded as an important word is set in advance and stored in the storing section 8. The important word recognizing section 2 determines the kind of the character ornament attached to the words composing the inputted text and extracts a word to which the same character ornament as the stored character ornament is attached and a word having the same character string as that of the word to which the same character ornament as the stored character ornament is attached. The important word recognizing section 2 recognizes the extracted word as the important word. The recognized important word is stored in the storing section 8, together with the kind of the character ornament.

(4) The character size of a word to be regarded as an important word is set in advance and stored in the storing section 8. The important word recognizing section 2 determines the character size of the words composing the inputted text and extracts a word having the same character size as that of the stored character size and a word having the same character string as that of the word having the same size as the stored character size. The important word recognizing section 2 recognizes the extracted word as the important word. The recognized important word is stored in the storing section 8, together with the character size.

(5) The character style of a word to be regarded as an important word is set in advance and stored in the storing section 8. The important word recognizing section 2 determines the character style of words composing an inputted text and extracts a word having the same character style as the stored character style and a word having the same character string as that of the word having the same character style as the stored character style. The important word recognizing section 2 recognizes the extracted word as the important word. The recognized important word is stored in the storing section 8, together with the character style.

(6) The grammatical construction role (for example, subject of principal sentence) of a word to be regarded as an important word is set in advance and stored in the storing section 8. The important word recognizing section 2 determines the grammatical construction role of words composing an inputted text and extracts a word playing the stored grammatical construction role and a word having the same character string as that of the word playing the stored grammatical construction role. The important word recognizing section 2 recognizes the extracted word as the important word. The recognized important word is stored in the storing section 8, together with the role in grammatical construction.

As to Important Word Weighting Section 3

In the embodiment, although the important word weighting section 3 is so constructed that it attaches the weight value "1" to all important words, it is possible to construct the important word weighting section 3 as follows:

(1) The weight value to be attached to the important word is set for each part of speech in advance and stored in the storing section 8. The important word weighting section 3 attaches a weight to the important word, according to the parts of speech of the important word recognized by the important word recognizing section 2.

(2) The weight value to be attached to the important word is set for each appearance frequency in advance and stored in the storing section 8. The important word weighting section 3 attaches a weight to the important word, according to the appearance frequency of the important word recognized by the important word recognizing section 2.

(3) The weight value to be attached to the important word is set for each appearance position in advance and stored in the storing section 8. The important word weighting section 3 attaches a weight to the important word, according to the appearance position of the important word recognized by the important word recognizing section 2.

(4) The weight value to be attached to the important word is set for each kind of character ornament in advance and stored in the storing section 8. The important word weighting section 3 attaches a weight to the important word, according to the kind of character ornament of the important word recognized by the important word recognizing section 2.

(5) The weight value to be attached to the important word is set for each character size in advance and stored in the storing section 8. The important word weighting section 3 attaches a weight to the important word, according to the character size of the important word recognized by the important word recognizing section 2.

(6) The weight value to be attached to the important word is set for each character style in advance and stored in the storing section 8. The important word weighting section 3 attaches a weight to the important word, according to the character style of the important word recognized by the important word recognizing section 2.

(7) The weight value to be attached to the important word is set for each role in grammatical construction in advance and stored in the storing section 8. The important word weighting section 3 attaches a weight to the important word, according to the role in grammatical construction of the important word recognized by the important word recognizing section 2.

As to Relation Degree Computing Section 4

In the embodiment, the relation degree computing section 4 is so constructed that it compares the character string of the original form of the important word in the attention sentence $S_j$ and the character string of the original form of the important word in the precedent sentence $S_I$ with each other, and using equation (1), computes the relation degree $d_{i-j}$ between the attention sentence $S_j$ and the precedent sentence $S_i$ when both the attention sentence $S_j$ and the precedent sentence $S_i$ have the same important word. But the relation degree computing section 4 may be constructed as follows:

(1) The relation degree computing section 4 recognizes the parts of speech, person, sex, number, and meaning of the attention sentence $S_j$ and those of the precedent sentence $S_i$ and compares them with each other. If an important word in the attention sentence $S_j$ is a pronoun and an important word in the precedent sentence $S_I$ is a noun or a pronoun and if the important words are coincident with each other in person, sex, and number and if the meanings of both important words have a rank relationship (if one important word is higher or lower than the other), the relation degree computing section 4 determines that both important words have a correspondence relationship, and using equation (1), computes the relation degree $d_{i-j}$ between the attention sentence $S_j$ and the precedent sentence $S_i$.

(2) The relation degree computing section 4 recognizes the stem of the important word of the attention sentence $S_j$ and that of the important word of the precedent sentence $S_i$ and compares the stems with each other. If the character string of the stem of the important word of the attention sentence $S_j$ and that of the stem of the important word of the precedent sentence $S_i$ are coincident with each other, the relation degree computing section 4 determines that both important words have a correspondence relationship, and using equation (1), computes the relation degree $d_{i-j}$ between the attention sentence $S_j$ and the precedent sentence $S_i$.

(3) The threshold of the distance between the attention sentence $S_j$ and the precedent sentence $S_j$ which are regarded as having a relation is set in advance and stored in the storing section 8. The relation degree computing section 4 measures the distance between the attention sentence $S_j$ and the precedent sentence $S_i$ (how many sentences are present between the attention sentence $S_j$ and the precedent sentence $S_i$). If a measured value does not exceed the stored threshold, it computes the relation degree $d_{i-j}$ between the attention sentence $S_j$ and the precedent sentence $S_i$.

Second Embodiment

Figure 8:
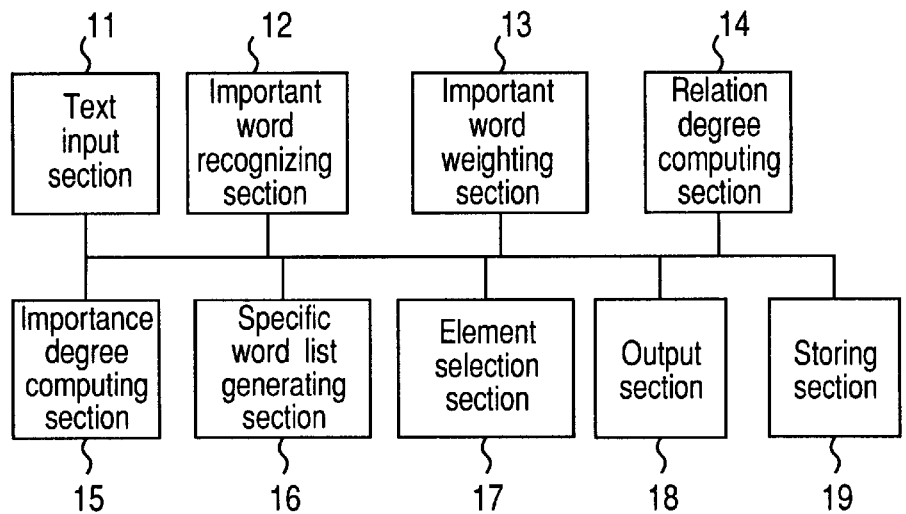
FIG. 8 is block diagram showing an abstracting apparatus of the present invention.

The second embodiment relates to an abstracting apparatus capable of obtaining highly precise and concise abstract by using the method of the first embodiment of analyzing the text structure. FIG. 8 is a block diagram showing the abstracting apparatus of the second embodiment.

A text input section 11, an important word recognizing section 12, an important word weighting section 13, a relation degree computing section 14, and an importance degree computing section 15 have the same construction and operation as those of the text input section 1, the important word recognizing section 2, the important word weighting section 3, the relation degree computing section 4, and the importance degree computing section 5. A specific word list generating section 16 extracts important words included in a title (for example, element $E_1$). A storing section 19 stores them as an element of the list of a specific word (zeroth element $E_0$ of text). An element selection section 17 decides the selection order of important elements (important sentence), based on the importance degree of each element E. An output section 18 selects the important elements in the selection order and outputs them as the abstract of an inputted text.

Figure 9:
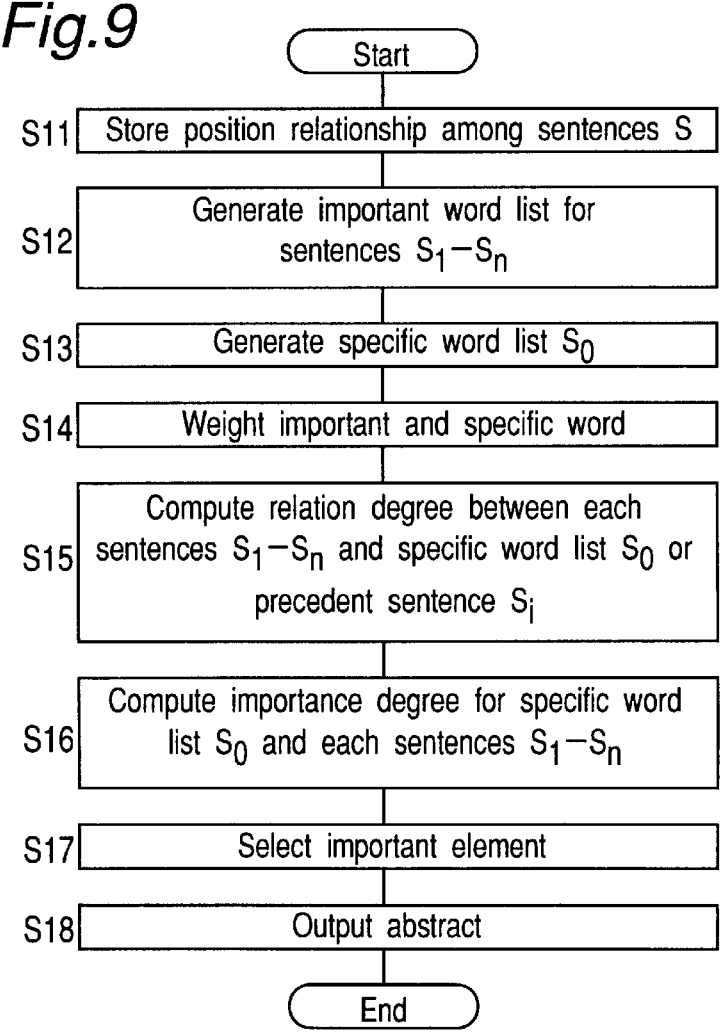
FIG. 9 is a flowchart of abstract generating processing to be executed by the abstracting apparatus shown in FIG. 8.

FIG. 9 is a flowchart showing abstract generating processing which is executed by the abstracting apparatus having the construction. With reference to FIG. 9, the operation of the abstracting apparatus will be described below. Although the element E is a sentence S, the element E may be a paragraph or the like.

Similarly to the processing to be executed at step S1 of the first embodiment shown in FIG. 2, at step S11, a text input section 11 divides an inputted text into sentences S. Then, data thus generated is stored in the data base of the storing section 19 in such a manner that the position relationship among the respective sentences S can be understood, as shown in FIG. 3.

Similarly to the processing to be executed at step S2 of the first embodiment shown in FIG. 2, at step S12, an important word recognizing section 12 recognizes important words of each sentence S with reference to a dictionary of the storing section 19. The important word recognizing section 2 generates an important word list for each of the sentences S. The storing section 19 stores the important word list. As in the case of the first embodiment, in the second embodiment, the important word recognizing section 12 recognizes noun, verb, adjective, and adverb as the important words.

At step S13, the specific word list generating section 16 extracts important words present in a sentence $S_1$ which is a title, with reference to the dictionary of the storing section 19. Then, the specific word list generating section 16 forms a specific word list $S_0$ of the extracted important words present in the title and attaches the specific word list $S_0$ in front of the head sentence $S_1$ of the inputted text to update the text data base.

Similarly to the processing to be executed at step S3 of the first embodiment shown in FIG. 2, at step S14, the important word weighting section 13 weights the important words extracted from the respective sentences S. In this case, a weight value "1" is attached to all the important words.

Similarly to the operation to be executed at step S4 of the first embodiment shown in FIG. 2, at step S15, based on the important word list and the weighted value, the relation degree computing section 14 computes the relation degree between an attention sentence $S_j$ and a specific word list $S_0$ or between the attention sentence $S_j$ and the precedent sentence $S_i$. The relation degree is computed based on:

1) The distance between the attention sentence $S_j$ and the specific word list $S_0$ or between the attention sentence $S_j$ and the precedent sentence $S_i$;
2) The weight of each important word included in the attention sentence $S_j$ or the weight of each important word included in the specific word list $S_0$ or in the precedent sentence $S_i$;
3) Semantic connection between the important word included in the attention sentence $S_j$ and the important word included in the specific word list $S_0$ or in the precedent sentence $S_i$;
4) Correspondence between the important word included in the attention sentence $S_j$ and the important word included in the specific word list $S_0$ or in the precedent sentence $S_i$; and the like.

Similarly to the operation to be executed at step S5 of the first embodiment shown in FIG. 2, at step S16, the importance degree computing section 15 computes the importance degree $I_j$ of the attention sentence $S_j$. In the second embodiment, the importance degree $I_1$ of the specific word list $S_0$ is set to "1". FIG. 10 shows the specific word list $S_0$ of the inputted text shown in FIG. 3 and the importance degree I of each sentence $S_0$.

At step S17, the element selection section 17 executes selection of important elements, namely, selection of the sentences S in descending order of the importance degree I thereof to decide a selection order. When there is a plurality of sentences S having the same importance degree I, the precedent sentence S is preferentially selected. FIG. 10 shows the selected order of the important elements regarding the inputted text (shown in FIG. 3) thus decided. The element selection section 17 is so constructed that it selects sentences corresponding to 25% of the total of the sentences S as the important elements. In the case of the inputted text shown in FIG. 3, the total of the sentences S is "10". Thus, the first, second, and third highest sentences $S_1$, $S_4$, and $S_6$ are selected according to the selection order shown in FIG. 10.

At step S18, the sentences S selected as the important elements at step S17 are read from the text data base in the selection order determined at step S17 and outputted from the output section 18 as an abstract. FIG. 11 shows the abstract consisting of the first, second, and third highest-rank sentences $S_1$, $S_4$, and $S_6$ corresponding to 25% of the total of the sentences S obtained from the inputted text. When the output section 18 outputs the abstract, the abstract generating processing terminates.

As described above, in the second embodiment, similarly to the first embodiment, owing to the operation of the text input section 11 and the important word recognizing section 12, the data of the inputted text is stored in the text data base of the storing section 19 such that the position relationship among sentences S can be understood, and the important word list is generated from the sentences S and stored in the storing section 19. The important word is extracted from the title sentence by the specific word list generating section 16 and stored in the storing section 19 as the specific word list $S_0$. Then, similarly to the first embodiment, the importance degree I of each of the sentences S is computed by the relation degree computing section 14 and the importance degree computing section 15. Then, based on the importance degree I of each of the sentences S, the element selection section 17 determines the selection order of the important elements.

That is, according to the second embodiment, unlike the case in which the character strings of key words are merely coincident with each other, based on the importance degree I obtained in consideration of the relation degree d between the attention sentence $S_j$ and the specific word list $S_0$ or between the attention sentence $S_j$ and the precedent sentence $S_i$, namely, in much consideration of the connection between two sentences S, the selection order of the sentences S can be determined as the important element. Accordingly, it is possible to select only a sentence having a high degree of relation with the specific word list $S_0$ generated from the title sentence S of the inputted text as the element of the abstract, by outputting the important sentence from the output section 18 as the abstract by selecting it in the selection order thus determined. Thus, it is possible to delete from the abstract a sentence related insufficiently with the specific word list $S_0$ generated based on the title sentence and generate the abstract highly accurate and concise.

A modification of the second embodiment will be described below.

As to Specific Word List Generating Section 16

In the embodiment, although the specific word list generating section 16 is so constructed that it recognizes noun, verb, adjective, and adverb as the important words, the specific word list generating section 16 may be constructed as follows:

(1) The range of the appearance frequency in which a word to be regarded as the specific word appears is set in advance and stored in the storing section 19. The specific word list generating section 16 counts the appearance frequency of words constituting the inputted text. If a counted value falls in the range, the specific word list generating section 16 recognizes the word as the specific word. The recognized specific word is stored in the storing section 8, together with the appearance frequency.

(2) The appearance position of a sentence to which the word to be regarded as the specific word belongs is set in advance and stored in the storing section 19. The specific word list generating section 16 recognizes the word in the sentence present at the appearance position as the specific word. The recognize d specific word is stored in the storing section 19, together with the appearance position.

(3) The kind of character ornament of the word to be regarded as the specific word is set in advance and stored in the storing section 19. The specific word list generating section 16 determines the kind of the character ornament attached to the words composing the inputted text and recognizes a word to which the same character ornament as the stored character ornament is attached as the specific word. The recognized specific word is stored in the storing section 19, together with the kind of the character ornament.

(4) The character size of the word to be regarded as the specific word is set in advance and stored in the storing section 19. The specific word list generating section 16 determines the character size of the words composing the inputted text and recognizes the word having the stored character size as the specific word. The recognized specific word is stored in the storing section 19, together with the character size.

(5) The character style of the word to be regarded as the specific word is set in advance and stored in the storing section 19. The specific word list generating section 16 determines the character style of the words composing the inputted text and recognizes a word having the stored character style as a specific word. The recognized specific word is stored in the storing section 19, together with the character style.

(6) The grammatical construction role of a word to be regarded as the specific word is set in advance and stored in the storing section 19. The specific word list generating section 16 determines the grammatical construction role of the words composing the inputted text and recognizes the stored word having the word grammatical construction role as the specific word. The recognized specific word is stored in the storing section 19, together with the role in grammatical construction.

(7) Words (for example, preposition (at, of, and the like) and article (a, an, the)) which should not be regarded as the specific word are stored in advance in the storing section 19. The specific word list generating section 16 checks words inputted by a user and the words which should not be regarded as the specific word with each other as to whether they are coincident with each other. If the former is not coincident with the latter, the former is stored as the specific word.

Third Embodiment

Figure 12:
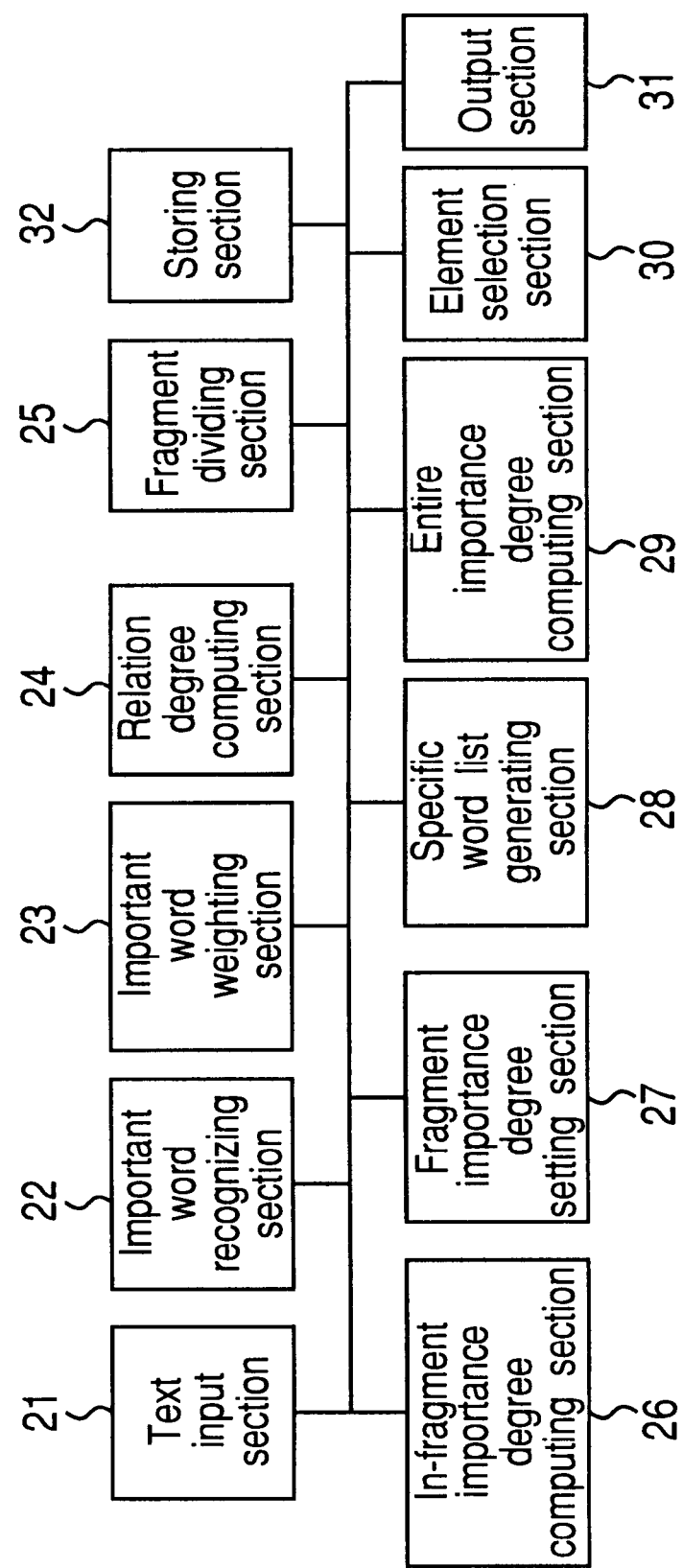
FIG. 12 is block diagram showing an abstracting apparatus of the present invention different from that shown in FIG. 8.

The third embodiment relates to an abstracting apparatus capable of obtaining highly precise and concise abstract from a text constituted of a plurality of sub-topics by using the method of analyzing the text structure of the first embodiment. FIG. 12 is a block diagram showing the abstracting apparatus of the second embodiment.

A text input section 21 and an important word weighting section 23 have the same construction and operation as those of the text input section 1 and the important word weighting section 3 of the text structure analyzing apparatus shown in FIG. 1. A fragment dividing section 25 divides the inputted text into fragments F for each sub-topic by means of a paragraph and the like. In each fragment F obtained by the fragment dividing section 25, an important word recognizing section 22 and a specific word list generating section 28 execute generation of a list of important words, generation of a list of specific words respectively, and a relation degree computing section 24 and an in-frame importance degree computing section 26 compute the relation degree between each attention element $E_j$ and a precedent element $E_i$, the importance degree of each element E, respectively. A fragment importance degree setting section 27 sets relative importance degrees among respective fragments F. An entire importance degree computing section 29 computes an importance degree (hereinafter referred to as entire importance degree) of each element E in an entire inputted text, based on the importance degree in the fragment F and the importance degree of each fragment F. An element selection section 30 determines the selection order of important elements, based on the entire importance degree of each element E. The output means 31 outputs the selected important element as the abstract of the inputted text.

Figure 13:
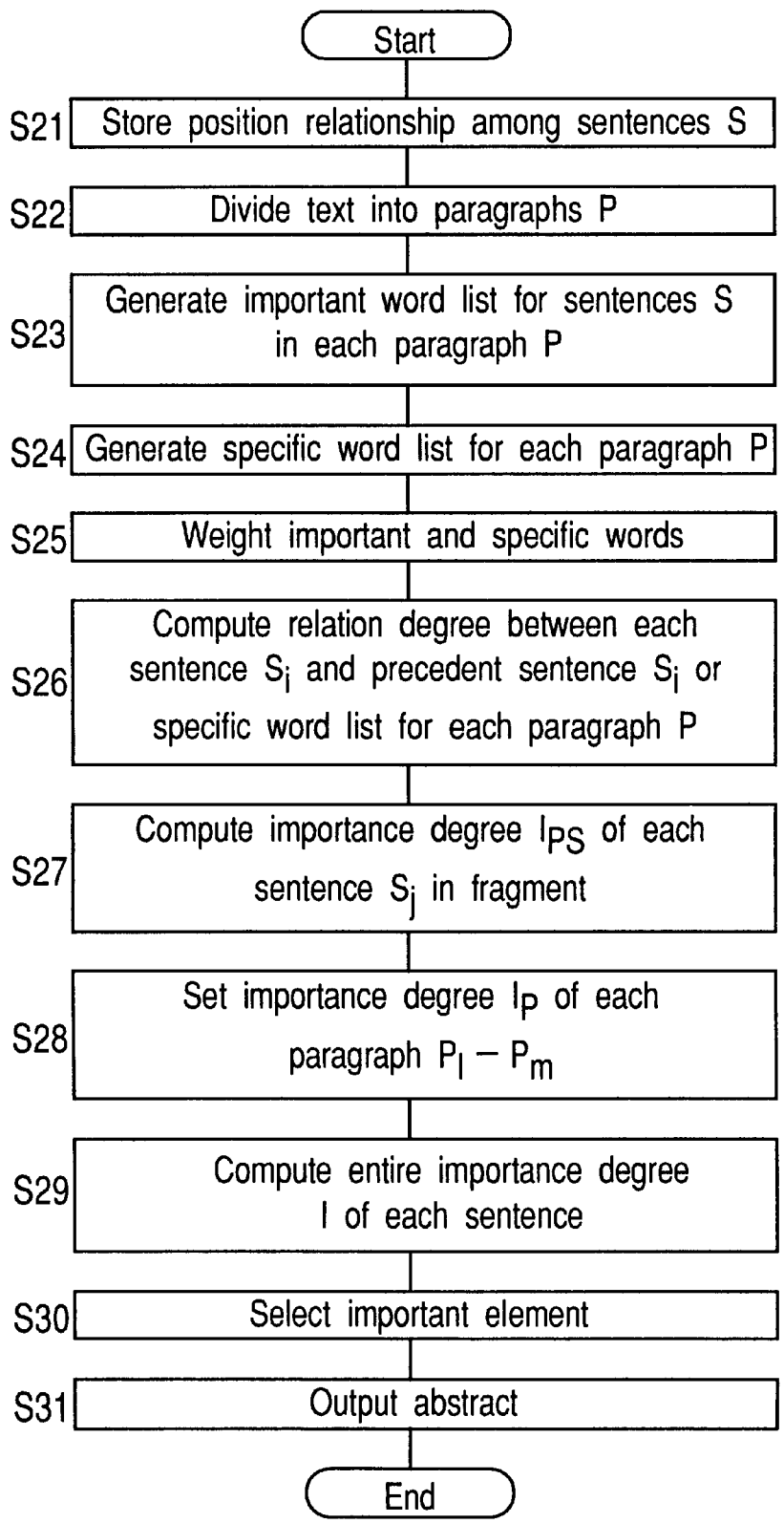
FIG. 13 is a flowchart of abstract generating processing to be executed by the abstracting apparatus shown in FIG. 12.

FIG. 13 is a flowchart showing abstract generating processing which is executed by the abstracting apparatus having the construction. With reference to FIG. 13, the operation of the abstracting apparatus will be described below. The element E is a sentence S, and the fragment F is a paragraph P.

Similarly to the operation to be executed at step S1 of the first embodiment shown in FIG. 2, at step S21, the text input section 21 divides an inputted text into sentences S. Then, the text input section 21 attaches a number to each sentence S, and data thus generated is stored in the data base of the storing section 32 as shown in FIG. 14 in such a manner that the position relationship among the respective sentences S can be understood.

At step S22, the fragment dividing section 25 divides the inputted text into a plurality of paragraphs P. In this embodiment, the paragraph P is recognized by means of indention. An indented sentence S is regarded as the head sentence of a paragraph P. In the case of a text exemplified in FIG. 14, because a sentence $S_{13}$ is indented, sentences $S_1$ through $S_{12}$ are a first paragraph $P_1$, and sentences $S_{13}$ through $S_{22}$ are a second paragraph $P_2$.

Similarly to the operation executed at step S2 of the first embodiment shown in FIG. 2, at step S23, the important word recognizing section 22 recognizes important words of each of the sentences S with reference to the dictionary of the storing section 32. The important word recognizing section 22 generates an important word list by the sentence for each of the paragraphs P. The important word list is stored in the storing section 32. As in the case of the first embodiment, in the third embodiment, the important word recognizing section 22 recognizes noun, verb, adjective, and adverb as the important words.

At step S24, the specific word list generating section 28 extracts important words present in title sentences (head sentences $S_1$ and $S_{13}$ of each of the paragraphs $P_1$ and $P_2$ in the case of the text shown in FIG. 14) with reference to the dictionary of the storing section 32. Then, the important words are stored in the storing section 32 as elements of a specific word list $S_0$.

Similarly to the processing executed at step S3 of the first embodiment shown in FIG. 2, at step S25, the important word weighting section 23 weights the important words extracted from the respective sentences S. In this case, a weight value "1" is attached to all the important words.

Similarly to the processing executed at step S4 of the first embodiment shown in FIG. 2, at step S26, based on the important word list and the weighted value, the relation degree computing section 24 computes the relation degree between an attention sentence $S_j$ and a specific word list $S_0$ or between the attention sentence $S_j$ and the precedent sentence $S_i$ for each paragraph P.

Similarly to the processing executed at step S5 of the first embodiment shown in FIG. 2, at step S27, the in-fragment importance degree computing section 26 computes the importance degree $I_{PSj}$ of the attention sentence $S_j$ for each paragraph P. In this embodiment, the importance degree $I_{PSO}$ of the specific word list $S_0$ of the inputted text shown in FIG. 14 is set to "1". FIGS. 15A and 15B show the importance degree $I_{PSO}$ of the specific word list $S_0$ of the inputted text shown in FIG. 14 and the importance degree $I_{PS}$ of each sentence $S_j$. FIG. 15A shows the importance degree $I_{PS}$ of each sentence S in the first paragraph $P_1$. FIG. 15B shows the importance degree $I_{PS}$ of each sentence S in the second paragraph $P_2$.

At step S28, the fragment importance degree setting section 27 sets relative degrees of importance among the respective paragraphs P. In many cases, the content of the first paragraph $P_1$ of the inputted text is more important than those of other paragraphs $P_k$. Thus, in the third embodiment, "1" is set as the importance degree $I_{P1}$ of the first paragraph $P_1$, and "0.5" is set as the importance degree $I_{P2}$ of the second paragraph $P_2$ for example. If there are third paragraph $P_3$ and succeeding paragraphs $P_k$, an appropriate number is set as an importance degree $I_{Pk}$ of each of the paragraphs $P_k$.

At step S29, using an equation (4) shown below, the entire importance degree computing section 29 computes the entire importance degree $I_j$ of the attention sentence $S_j$ in the entire inputted text, based on the importance degree $I_{PS}$ of each sentence S in each paragraph P determined at step S27 and on the relative importance degree $I_P$ of each paragraph P set at step S28.

$I_j$=(importance degree $I_{Pk}$ of paragraph $P_k$ to which $S_j$ belongs)× (importance degree $I_{PSj}$ of $S_j$ in paragraph $P_k$) (4)

FIG. 16 shows the entire importance degree I of the text shown in FIG. 14. The algorithm of computing the entire importance degree I is not limited to equation (4).

At step S30, the element selection section 30 selects the sentences S in descending order of the entire importance degree I thereof. When there is a plurality of sentences S having the same entire importance degree I, the precedent sentence S is preferentially selected. FIG. 16 shows the thus decided selection order of the important elements regarding the inputted text shown in FIG. 14.

At step S31, the sentences S selected as the important elements at step S30 are read from the text data base in the selection order decided at step S30 and outputted as an abstract. When the abstract is outputted, the abstract generating processing terminates.

As described above, in the third embodiment, the fragment dividing section 25 divides the inputted text transferred from the text input section 21 into a plurality of paragraphs P. Thereafter, for each paragraph P, the important word recognizing section 22 generates the important word list for each paragraph P; the specific word list generation section 28 generates the specific word list $S_0$; the relation degree computing section 24 computes the relation degree d between the attention sentence $S_j$ and the precedent sentence $S_i$; and the in-fragment importance degree computing section 26 computes the importance degree $I_{PS}$ of each sentence S. In addition, the fragment importance degree setting section 27 sets the importance degree $I_P$ of each paragraph P. Then, the entire importance degree computing section 29 computes the entire importance degree $I_j$ of the attention sentence $S_j$ in accordance with equation (4), based on the importance degree $I_{PSj}$ of the attention sentence $S_j$ in each paragraph P and the importance degree $I_{Pk}$ of the paragraph $P_k$ to which the attention sentence $S_j$ belongs. Thereafter, based on the entire importance degree I of each sentence S, the element selection section 30 determines the selection order of the important elements.

As described above, in the third embodiment, in the case of the inputted text having the sub-topic, each of the fragments E is set such that one sub-topic is included therein to determine the entire importance degree I which is the importance degree of each sentence S in the entire inputted text, based on the importance degree of each sentence S in each sub-topic and the importance degree of the sub-topic to which each sentence S belongs. Accordingly, it is possible to determine the entire importance degree I of each sentence in consideration of the importance degree in each sub-topic. Thus, when topics are switched from one to another, it is possible to select an important element according to the importance degree of each sub-topic and generate an abstract having a high degree of accuracy even from a text constituted of a plurality of sub-topics. In addition, in this case, the importance degree in consideration of the relation degree $d_{i-j}$ between the attention sentence $S_j$ and the precedent sentence $S_I$ is used. Accordingly, it is possible to select only a sentence related at a high extent with the specific word list generated from the title sentence of the inputted text as the element of an abstract. Thus, it is possible to generate the abstract highly accurate and concise.

As apparent from the foregoing description, in the text structure analyzing apparatus of the present invention, a relationship among appearance positions of respective elements of an inputted text is stored; a relation degree representing strength of connection between an attention element and each precedent element is computed; an importance degree of the attention element is computed, based on the relation degree and the importance degree of a head element of the inputted text; tree structure of the inputted text is determined by setting the precedent element having an optimum importance degree it concerning the attention element as a parent element of the attention element. Thus, candidates of the parent element are compared with each other in much consideration of the connection between the two elements. Therefore, according to the present invention, it is possible to obtain the tree structure in which only an element having a high degree of relation with the attention element is set as the parent element. That is, it is possible to analyze the structure of the inputted text with high accuracy.

Because the text structure analyzing apparatus of an embodiment deals with a sentence as an element, it is possible to analyze the structure of the inputted text by comparing candidates of the parent sentence with each other in much consideration of the connection between two sentences.

In the text structure analyzing apparatus of an embodiment; important words are recognized from among words constituting the respective elements; and the respective recognized important words are weighted. The relation degree between the attention element and the precedent element is computed, based on the total value of weights of all the important words common to the attention element and to the precedent element obtained by comparing the importance degree of the attention element and that of the precedent element with each other and based on the number of all the important words in the attention element or the number of all the important words in the precedent element. Thus, it is possible to provide the relation degree corresponding to the total value of the weights of all the important words common to the attention element and to the precedent element. In this manner, an optimum relation degree can be obtained according to the degree of connection between the attention element and the precedent element.

According to the text structure analyzing apparatus of an embodiment, parts of speech to be recognized as the important words are set and stored in advance; and words corresponding to parts of speech to be recognized as the important words are recognized from among words in the respective elements as the important words. Thus, the important words can be easily recognized by consulting a dictionary.

According to the text structure analyzing apparatus of an embodiment, important words are recognized from among words constituting the respective elements; the meaning of each of the recognized important words is recognized; and when the meanings of two important words of the attention and precedent elements have a rank relationship, an analogous relationship, a part-to-whole relationship and the like, both important words are regarded to have a semantic connection. The relation degree of the attention and precedent elements is computed based on the total value of the weights of all the important words, having the semantic connection, in the attention and precedent elements and on the number of all the important words in the attention element or the number of all the important words in the precedent element. Therefore, an optimum relation degree can be obtained according to the degree of connection between the attention element and the precedent element.

In the abstracting apparatus of the present invention, the relationship among appearance positions of respective elements of an inputted text is stored; a list of specific words recognized from among words constituting a specific element is attached to the front of a head element of the inputted text; a relation degree representing strength of connection between an attention element and each precedent element is computed; an importance degree of the attention element is computed based on the relation degree between the attention element and each precedent element and the importance degree of the list of specific words; a predetermined number of elements is selected in a descending order from an element having a highest importance degree obtained by the computation; and the selected predetermined number of elements is outputted as an abstract of the inputted text. Therefore, candidates of the parent element are compared with each other in much consideration of the connection between the two elements, and thus it is possible to select only an important element having a high degree of relation with the list of specific words as the abstract. Therefore, according to the present invention, it is possible to generate the abstract which has high accuracy and is concise.

Because the element of the abstracting apparatus of an embodiment is a sentence, comparison between candidates of a parent sentence can be made in much consideration of the connection between two sentences. Thus, it is possible to select only a sentence having a high degree of relation with the list of specific words as the abstract.

In the abstracting apparatus of an embodiment, parts of speech to be recognized as specific words are set and stored in advance; a word corresponding to parts of speech to be recognized as the specific word is recognized from among words representing the title. Thus, the specific word can be recognized easily by consulting a dictionary.

In the abstracting apparatus of the present invention, the relationship among appearance positions of respective elements of an inputted text is stored; the inputted text is divided into larger fragments than the elements; a list of specific words recognized in each of the fragments from among words constituting a specific element is attached to the front of a head element of the inputted text; a relation degree representing strength of connection between the attention element and each precedent element is computed; an importance degree of the attention element is computed in each of the fragments, based on the relation degree between the attention element and the each precedent element and the importance degree of the list of specific words; an importance degree of each fragment is set; an entire importance degree of the attention element is computed, based on the importance degree of the attention element in each fragment and the importance degree of the fragment to which the attention element belongs; a predetermined number of elements is selected in a descending order from an element having the highest entire importance degree; and the selected predetermined number of elements is outputted as an abstract of the inputted text. Thus, for each fragment, it is possible to select only an element having a high degree of relation with the list of specific words as the candidate of the abstract. Therefore, according to the present invention, even if the contents of descriptions of fragments are varied every fragment, it is possible to generate the abstract of each fragment, according to the importance degree of each fragment.

Because the element of the abstracting apparatus of an embodiment is a sentence, and the fragment is a paragraph, it is possible to select only an element having a high degree of relation with the list of specific words as the candidate of the abstract for each paragraph composing the inputted text. Accordingly, even though the contents of the descriptions of fragments are varied, it is possible to generate the abstract of each fragment, according to the importance degree of each fragment.

In the abstracting apparatus of an embodiment, importance degrees to be imparted to the respective fragments are classified and stored according to the appearance position of each of the fragments; the importance degree of the attention fragment is set with reference to the stored appearance position of each of the fragments. Thus, for example, a high degree of importance is imparted to a head fragment supposed to contain many important elements. In this case, it is possible to generate an abstract by automatically selecting important elements preferentially from a fragment having a higher degree of relation with the head fragment.

In the program recording medium of the present invention, a text structure-analyzing program is recorded to function the sections of the text structure analyzing apparatus, namely, the element appearance position storing section; the relation degree computing section; the importance degree computing section; the structure determining section; and the output section. Thus, similarly to the text structure analyzing apparatus, candidates of the parent element are compared with each other in much consideration of the connection between two elements. Therefore, it is possible to analyze the structure of the inputted text with high accuracy, by setting only an element having a high degree of relation with the attention element as the parent element.

In the program recording medium of the present invention, an abstracting program is recorded to function the sections of the abstracting apparatus, namely, the element appearance position storing section; the specific word list generating section; the relation degree computing section; the importance degree computing section; the element selection section; and the output section. Thus, similarly to the abstracting apparatus, it is possible to select only an important element having a high degree of relation with the list of specific words as the abstract. Therefore, it is possible to generate the abstract which has high accuracy and is concise.

In a program recording medium of the present invention, an abstracting program is recorded to function the sections of the abstracting apparatus, namely, the element appearance position storing section; the fragment dividing section; the specific word list generating section; the relation degree computing section; the infragment importance degree computing section; the entire importance degree computing section; the element selection section; and the output section. Thus, similarly to the abstracting apparatus, for each fragment greater than the respective elements, it is possible to select only an element having a high degree of relation with the list of specific words as the candidate of the abstract. Accordingly, even though the contents of the descriptions of fragments are varied every fragment, it is possible to generate the abstract of each fragment, according to the importance degree of each fragment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A text structure analyzing apparatus analyzing a connection between respective elements constituting a text and based on an analyzed result, indicating a structure of the text by means of a tree structure which represents the respective elements as nodes, comprising:

an element appearance position storing section dividing an inputted text into the elements and storing an appearance position relationship among the elements on the inputted text;

a relation degree computing section determining a precedent element of an attention element with reference to the appearance position relationship and computing a relation degree representing strength of a connection between the attention element and each precedent element;

an importance degree computing section computing an importance degree of the attention element, based on a relation degree between the attention element and each precedent element and an importance degree of a head element of the inputted text;

a structure determining section determining a tree structure of the inputted text by determining the precedent element having an optimum value as an importance degree of the attention element as a parent element of the attention element; and an output section outputting the determined tree structure of the inputted text.

2. A text structure analyzing apparatus according to claim 1, wherein the element is a sentence.

3. A text structure analyzing apparatus according to claim 1, further comprising:

an important word recognizing section recognizing important words from words constituting the respective elements;

and important word weighting section weighting each of the recognized important words, wherein the relation degree computing section has an important word comparing part for comparing a character string of an original form of each of the important words in the attention element with a character string of an original form of each of the important words in the precedent element to compute a relation degree between the attention element and the precedent element, based on a total value of weights of all the important words common to the attention element and to the precedent element and a number of all the important words in the attention element or a number of all the important words in the precedent element.

4. A text structure analyzing apparatus according to claim 3, comprising:

an important word information storing section in which parts of speech to be recognized as the important words are stored, wherein the important word recognizing section has a part of speech recognizing section for recognizing parts of speech in the respective elements; and a part of speech comparing section for comparing the recognized parts of speech and parts of speech to be recognized as the important words with each other to recognize words corresponding to parts of speech to be recognized as the important words from among words in the respective elements.

5. A text structure analyzing apparatus according to claim 1, comprising:

an important word recognizing section recognizing important words from words constituting the elements;

a meaning recognizing section recognizing meaning of each of the recognized important words; and a concept system storing section storing a concept system for recognizing rank relationship between meanings of two of the recognized important words, an analogous relationship therebetween, and a part-to-whole relationship therebetween;

wherein the relation degree computing section has a determining section which regards that with reference to the concept system, one of the recognized important words in the attention element and one of the recognized important words in the precedent element have a semantic connection when the two important words have the rank relationship among meanings thereof, the analogous relationship therebetween, and the part-to-whole relationship therebetween to compute a relation degree between the attention element and the precedent element, based on a total value of weights of all the important words, having the semantic connection, in the attention element and the precedent element and the number of all the important words in the attention element or the number of all the important words in the precedent element.

6. An abstracting apparatus analyzing a connection between respective elements constituting a text and generating an abstract of the text by imparting an importance degree to the respective elements, based on an analyzed result and selecting the respective elements in the order from a higher importance degree to a lower importance degree comprising:

an element appearance position storing section dividing an inputted text into the elements and storing an appearance position relationship among the elements on the inputted text;

a specific word list generating section generating a list of specific words by recognizing the specific words from among words constituting a specific element and attaching the generated specific word list to a front of a head element of the inputted text;

a relation degree computing section determining a precedent element of an attention element with reference to the appearance position relationship in which the specific word list is set as a head element and computing a relation degree representing strength of a connection between the attention element and each precedent element;

an importance degree computing section computing an importance degree of the attention element, based on a relation degree between the attention element and each precedent element and an importance degree of the specific word list, an element selection section selecting a predetermined number of elements in a descending order from an element having a highest importance degree obtained by computation; and an output section outputting the selected predetermined number of elements as an abstract of the inputted text.

7. An abstracting apparatus according to claim 6, wherein the element is a sentence.

8. An abstracting apparatus according to claim 6, further comprising a specific word information storing section in which parts of speech to be recognized as the specific words are stored, wherein the specific word list generating section has a part of speech recognizing section for recognizing parts of speech of words constituting an element representing a title; and a part of speech comparing section for comparing the recognized part of speech and the parts of speech to be recognized as the specific words with each other to recognize as the specific word a word corresponding to the parts of speech to be recognized as the specific word from among the words constituting the element representing the title.

9. An abstracting apparatus analyzing a connection between respective elements constituting a text and generating an abstract of the text by imparting an importance degree to the respective elements, based on an analyzed result and selecting the respective elements in the order from a higher importance degree to a lower importance degree, comprising:

an element appearance position storing section dividing an inputted text into the elements and storing an appearance position relationship among the elements on the inputted text;

a fragment dividing section dividing the inputted text into larger fragments than the elements;

a specific word list generating section generating a list of specific words in each of the fragments by recognizing the specific words from among words constituting a specific element and attaching the generated specific word list to a front of a head element of the inputted text;

a relation degree computing section determining a precedent element of an attention element in each of the fragments with reference to the appearance position relationship in which the specific word list is set as a head element and computing a relation degree representing strength of a connection between the attention element and each precedent element;

an in-fragment importance degree computing section computing an importance degree of the attention element in each of the fragments, based on a relation degree between the attention element and each precedent element and an importance degree of the specific word list, a fragment importance degree setting section setting an importance degree of each fragment;

an entire importance degree computing section computing an importance degree of the attention element in the entire inputted text, based on an importance degree of the attention element in each fragment and an importance degree of the fragment to which the attention element belongs;

an element selection section selecting a predetermined number of elements in a descending order from an element having a highest importance degree, in the entire inputted text, obtained by computation; and an output section outputting the selected predetermined number of elements as an abstract of the inputted text.

10. An abstracting apparatus according to claim 9, wherein the element is a sentence, and the fragment is a paragraph.

11. An abstracting apparatus according to claim 9, further comprising:

a fragment importance degree storing section classifying and storing importance degrees to be imparted to the fragments according to an appearance position of each of the fragments in the inputted text, wherein the fragment importance degree setting section determines an appearance position of an attention fragment on the inputted text with reference to an appearance position relationship among the elements in which the specific word list is set as a head element and sets an importance degree of the attention fragment with reference to an appearance position of each of the fragments stored in the fragment importance degree storing section.

12. A program recording medium in which a text structure-analyzing program is recorded to function:

an element appearance position storing section dividing an inputted text into elements and storing an appearance position relationship among the elements on the inputted text;

a relation degree computing section computing a relation degree representing strength of connection between an attention element and each of precedent elements;

an importance degree computing section computing an importance degree of the attention element, based on a relation degree between the attention element and each precedent element and an importance degree of a head element of the inputted text;

a structure determining section determining a structure of the inputted text by setting the precedent element having an optimum value as the importance degree of the attention element as a parent element of the attention element; and an output section outputting the determined tree structure of the inputted text.

13. A program recording medium in which a text structure-analyzing program is recorded to function:

an element appearance position storing section dividing an inputted text into elements and storing an appearance position relationship among the elements on the inputted text;

a specific word list generating section generating a list of specific words by recognizing the specific words from among words constituting a specific element and attaching the generated specific word list to a front of a head element of the inputted text;

a relation degree computing section computing a relation degree representing the strength of connection between an attention element and each precedent element;

an importance degree computing section computing an importance degree of the attention element, based on a relation degree between the attention element and each precedent element and an importance degree of the list of specific words;

an element selection section selecting a predetermined number of elements in a descending order from an element having a highest importance degree obtained by the computation; and an output section outputting the selected predetermined number of elements as an abstract of the inputted text.

14. A program recording medium in which a text structure-analyzing program is recorded to function:

an element appearance position storing section dividing an inputted text into elements and storing an appearance position relationship among the elements on the inputted text;

a fragment dividing section dividing the inputted text into larger fragments than the elements;

a specific word list generating section generating a list of specific words by recognizing the specific words from among words constituting a specific element in each fragment and attaching the generated list of specific words to a front of a head element of each fragment;

a relation degree computing section computing a relation degree representing strength of connection between the attention element and each precedent element in each fragment;

an in-fragment importance degree computing section computing an importance degree of the attention element, based on a relation degree between the attention element and each precedent element in each of the fragments and an importance degree of the list of specific words;

a fragment importance degree setting section setting an importance degree of each of the fragments;

an entire importance degree computing section computing an importance degree of the attention element in the entire inputted text, based on an importance degree of the attention element in each fragment and an importance degree of the fragment to which the attention element belongs;

an element selection section selecting a predetermined number of elements in a descending order from an element having a highest importance degree, in the entire inputted text, obtained by computation; and an output section outputting the selected predetermined number of elements as an abstract of the inputted text.

* * * * *